United States Patent [19]

Welp et al.

[11] Patent Number: 5,215,594
[45] Date of Patent: Jun. 1, 1993

[54] PROCESS FOR CLEANING SURFACES OF INTERIOR PARTS IN TWO-STAGE FLUE GAS DESULFURIZATION PLANTS

[75] Inventors: Helmut Welp, Oshsenfurt; Farrokh Ghoreishi, Güntersleben; Reinhard Widzogowski, Würzburg, all of Fed. Rep. of Germany

[73] Assignee: KRC Umwelttechnik GmbH, Wurzburg, Fed. Rep. of Germany

[21] Appl. No.: 835,068

[22] Filed: Feb. 18, 1992

Related U.S. Application Data

[63] Continuation of Ser. No. 637,863, Jan. 8, 1991, abandoned.

[30] Foreign Application Priority Data

Jul. 25, 1990 [DE] Fed. Rep. of Germany ....... 4023540

[51] Int. Cl.$^5$ .......................... B08B 3/02; B08B 3/04; B08B 9/00
[52] U.S. Cl. ...................................... 134/22.1; 134/26; 423/243.01; 423/243.05
[58] Field of Search ................................. 134/22.1, 26; 423/242 A, 242 R

[56] References Cited

U.S. PATENT DOCUMENTS

| | | | |
|---|---|---|---|
| 2,080,779 | 5/1937 | Lessing | 423/242 A |
| 4,735,787 | 4/1988 | Mouché et al. | 423/242 R |
| 4,876,076 | 10/1989 | Colley | 423/242 |

FOREIGN PATENT DOCUMENTS 0235737 9/1987 European Pat. Off.

*Primary Examiner*—Theodore Morris
*Assistant Examiner*—Zeinab El-Arini
*Attorney, Agent, or Firm*—Wegner, Cantor, Mueller & Player

[57] ABSTRACT

A process for cleaning the surfaces of interior parts of two-stage flue gas desulfurization plants, which employ limestone as absorbent to form gypsum as the final product, such as guide plates and baffle plates and/or the discharge pipe and the bottom side of the feed hoppers, said interior parts being contacted by flue gas stream(s) and liquid absorbent. The process is characterized in that the parts and/or areas of said interior parts to be cleaned are washed periodically with process water or first with a portion of the absorbent suspension of the upper absorbent circulation and then with a portion of the process water.

6 Claims, No Drawings

PROCESS FOR CLEANING SURFACES OF INTERIOR PARTS IN TWO-STAGE FLUE GAS DESULFURIZATION PLANTS

This application is a continuation of U.S. application Ser. No. 07/637,863 fled Jan. 8, 1991, now abandoned.

The present invention relates to a process for cleaning surfaces of interior parts of two-stage flue gas desulfurization plants, contacted by flue gas stream(s) and liquid absorbent, which employ suspensions of limestone as absorbent to form gypsum as the final product.

One major advantage of two-stage flue gas desulfurization plants employing suspensions of limestone as absorbent to form gypsum as the final product is that, if operated under normal conditions, they do not tend to leave solid deposits as build-up and caking on the interior surfaces. Such plants are built and offered by the applicant.

The two-stage flue gas desulfurization plants typically comprise an absorbtion tower with an upper absorbent circulation system and a lower absorbent circulation system. The upper absorbent system comprises the circulation of absorbent from a tank containing absorbent (absorbent supply reservoir), into the tower and back to the absorbent tank via a collection funnel(s) in disposed in the upper portion of said tower. Similarly, the lower absorbent system comprises the circulation of overflow from the absorbent supply reservoir tank into the tower below the collection funnel of the upper system, and then back out of the tower. Thus the flue gas is washed in a two stage process, first by the lower absorbent system and then by the upper absorbent system.

In the lower region of the tower, air is pumped in to oxidize the gypsum. Absorbent, such as limestone, is pumped into the upper portion of the tower from the absorbent reservoir through spray nozzels and recirculated to the reservoir via a collecting funnel to ensure constant circulation from the reservoir to the tower in the upper system. The flue gas is pumped into the lower region of the absorbtion tower where the first stage of the purification occures. Here the gas is cooled, saturated with water vapor and sprayed with absorbent wash suspension from the reservoir. The flue gas migrates uppward in the tower and reaches the upper portion of the tower along the collecting funnel. Here, a second spraying with absorbent suspension achieves the remaining desulfurization and the flue gas then leaves the absorbtion tower.

In such plants the mist collectors (demisters) above the upper absorbent circulation system are critical to the function thereof. Thus, said demisters in general are rinsed with process water periodically or in some cases continuously. In many plants, the total amount of process water is introduced through the rinsing of the demisters.

Additionally, the surfaces of interior parts incorporated in the plant which are contacted by the flue gas and liquid absorbent are also critical to the operation of the plants. Said interior parts are, in particular, the guide plates and baffle plates within the annular clearance between the inner wall of the flue gas desulfurization plant, the collecting hoppers (funnel(s)) for the absorbent of the upper absorbent circulation system, the discharge pipe and the bottom side of the feed hoppers.

Even if the contact of flue gas and liquid absorbent with the interior parts does not interfere with the actual flue gas desulfurization, it causes solid deposit build-up and caking on the surfaces thereof which may cause malfunctions of the suspension pumps if it falls into the bottom of the lower absorbent circulation system. Furthermore, they may produce an undesirable oversized material which deteriorates the quality of the flue gas gypsum.

German application DE OS-36 07 192 discloses a process for regulating the water balance of desulfurization plants, wherein the water level and the amount of process water introduced through rinsing the demisters are measured. The demisters are rinsed in variable cycles comprising constant periods of spraying with variable intervals between the spraying periods. In order to clean the guide plates, baffle plates, the discharge pipe and the bottom side of the feed hoppers and to remove any deposits therefrom, it would be necessary to clean these parts and/or surfaces at least periodically.

The water balance of such two-stage flue gas desulfurization plants is adapted so that all or a majority of the process water is supplied through the rinsing of the demisters. Therefore, there is little or no process water available for clearing the interior parts such as the guide plates, baffle plates, discharge pipe and bottom side of the feed hoppers. Although the deposits formed in these areas, in contrast to deposits formed in the area of the demisters, are not critical for the actual flue gas desulfurization, they do, however, occasionally produce undesirable results such as the formation of oversized pieces of predominantly contaminated, coarsely crystalline flue gas gypsum. These pieces fall down into the bottom of the lower absorbent circulation system and cause mechanical malfunctions when they get into the pumps for the gypsum suspension and into the hydroclone. Furthermore, such pieces result in a fluctuation in the quality of the flue gas gypsum which normally should only have particle sizes of a maximum of 90 $\mu$m.

Thus, it is the object of the invention, in an easy and reliable operation, to clean the interior parts cf two-stage flue gas desulfurization plants, such as the guide plates, baffle plates, discharge pipe the bottom side of the feed hoppers, while using as small an amount of process water as possible. Said object can be attained in a surprisingly simple way wherein the interior parts to be cleaned are washed only periodically, either with small amounts of process water or first with a portion of the absorbent suspension from the upper absorbent circulation system and then with a small portion of the process water.

Attempts of the applicant to carry out said cleaning with a portion of the absorbent of the upper absorbent circulation system alone, without subsequently rinsing with process water, provided some improvement, but failed to give a fully satisfactory result. One reason therefor, among others, is that for such a cleaning procedure there is available only a very limited amount of the absorbent suspension from the upper absorbent circulation system. The maximum amount corresponds to the amount of overflow of the absorbent from the absorbent supply reservoir into the lower circulation system of the flue gas desulfurizaticn plant.

It was only the combination of cleaning with a partial amount of said overflow, on the one hand, and a small portion of the process water, on the other hand, that produced the desired result when said amounts of liquid were sprayed as a strong stream onto the surfaces with a sufficiently high amount of energy, such as, for example, 10–50 cubic meters per hour. Thus, it is required to impose some time limits on said spraying operation. Preferably the individual parts or surfaces thereof are alternately spray-treated in cyclic intervals dependent on the output. The total amount of process water in the system is that employed as the demister rinse water and additional water added to the system. This is determined by the amount of loss due to evaporation, the amount needed for formation of gypsum and the amount returned in the absorbent suspension to the reservoir.

It has now been found that solid deposits initially form as muddy deposit which harden only gradually. Encrustation and further growth of the solid deposits only starts some time after the formation of the muddy deposit. Thus, the interval times between two cleaning operations should not be so long that within said times a solid deposit build-up can occur.

The total amount of the absorbent overflow into the lower circulation system in addition to absorbent from the absorbent supply reservoir theoretically could be used for spraying and, hence, for cleaning. However, this will lead to the undesired effect that the overflow conduits run dry over an extended period of time and that the level in the absorbent supply reservoir will be lowered. Thus, preferably, the amount of the absorbent used for spraying is chosen to be smaller than the amount of the overflow of the absorbent into the lower circulation system from the absorbent supply reservoir during the intervals between spraying.

Furthermore, it has proven to be very advantageous to spray the absorbent as well as the process water through the same nozzles onto the parts or surfaces to be cleaned. This is done by intoducing the process water into the circulation pipes of the absorbent system through motor driven valves or traps. Thus, it is possible to regularly clean the spray nozzles with process water after spraying the absorbent and thereby avoid any contamination or clogging of the nozzles. Moreover, the suspension adhering to the parts or surfaces to be cleaned is quickly and sufficiently removed.

Flue gas desulfurization plants which comprise two or more towers and only one common absorbent supply reservoir tend to have an asymmetric operation. This is applicable to the filling levels within the lower absorbent circulation system as well as to the concentrations and the pH values. In the practice of the process according to the invention it is possible to compensate such undesirable asymmetric deviations between the different towers by controlling the spraying cycles independently from each other. This advantage is of particular importance unless the options according to DE-OS 36 07 192 are already utilized, wherein the differences between the resulting intervals between spraying in the individual washing towers can be measured and the uniform distribution of the absorbent suspension over the individual washing towers can be controlled. Nevertheless, the process according to the invention may also be combined with the measures according to the DE-OS 36 07 192.

In the case of flue gas desulfurization plants operated with frequent changes in the output load of the combustion plant, it is recommended to run the spraying cycle with variable time periods. At a higher load, not only the need for absorbent and process water is higher, but also there is a greater tendency towards a formation of solid deposit build-up and caking on the guide plates, baffle plates, the discharge pipe and the bottom side of the feed hoppers. Thus, in the periods of operation under a higher load there is available a larger amount of absorbent from the upper absorbent circulation system, on the one hand, and a larger amount of process water, on the other hand, which may be branched off from the cleaning or rinsing of the demisters. In periods of operation under a very low load, the amount of available process water is particularly low so that a particularly thrifty use thereof must be made. Nevertheless it is possible to run the plant under conditions such that only the time intervals and the periods of spraying with the absorbent from the upper absorbent circulation system will be varied, and then rinsing with process water is carried out for only a short constant period of time. The total amount of process water used therefor will constitute a substantially constant quantity in the water balance of the flue gas desulfurization plant without, however, increasing the total amount of process water.

Of course it will be possible according to the invention not only to spray individual guide plates and baffle plates, but also to spray groups of guide plates and baffle plates in combination. Spraying larger segments of interior parts comprising several guide plates and baffles at the same time will above all reduce the apparatus expenses. Thus, the size of the segments should depend on the amounts of absorbent available per unit time, on the one hand, and of process water, which can be branched off from rinsing the demister, on the other hand.

Moreover, in order to increase the flexibility of the plant according to the invention, it is possible to completely stop the cleaning of the interior parts such as guide plates and baffle plates and/or the discharge pipe and the bottom side of the feed hoppers, such as when malfunctions have occurred within the sector where the demisters are rinsed. Thus, the process according to the invention is suitable for effecting a safer, more reliable and more flexible operation of such flue gas desulfurization plants while simultaneously avoiding any further stress of the water balance.

The process according to the invention, apart from an unobjectionable and trouble-free flue gas desulfurization, additionally ensues that the two process circulation systems remain cleanly separated from each other and, thereby, the quality of the flue gas gypsum is improved, which in the meantime can be supplied for a number of useful further purposes.

What is claimed is:

1. A process for cleaning surfaces of interior parts of two stage desulfurization plant employing limestone as absorbent to form gypsum as the final product, said process comprising rinsing demisters with process water and washing portions of other interior parts of said two stage desulfurization plant with (a) small amounts of process water or with (b) a portion of the absorbent suspension of an upper absorbent circulation system followed by a small amount of process water as a strong stream onto the surfaces with a sufficiently high amount of energy to remove any muddy deposit before it hardens.

2. The process according to claim 1, wherein said parts are guide plates, baffle plates, a discharge pipe or the bottom sides of feed hoppers.

3. The process according to claim 1, wherein the individual surfaces are alternately spray-treated in a cyclic interval.

4. A process for cleaning surfaces of interior parts of two stage desulfurization plant employing limestone as absorbent to form gypsum as the final product, said process comprising washing the portions of said interior parts with (a) small amounts of process water or with (b) a portion of the absorbent suspension of an upper absorbent circulation system followed by a small amount of process water as a strong stream onto the surfaces with a sufficiently high amount of energy to remove any muddy deposit before it hardens, wherein the amount of absorbent used for spraying is smaller than the amount of overflow of the absorbent from an absorbent supply reservoir into a lower circulation system during intervals between the spraying periods.

5. The process according to claim 3, wherein the absorbent as well as the process water are sprayed onto the surfaces to be cleaned through the same nozzle.

6. The process according to claim 3, wherein the spray cycles are controlled independently of each other when multiple flue gas desulfurization plants are supplied from one absorbent supply reservoir.

* * * * *